United States Patent Office 3,464,975
Patented Sept. 2, 1969

3,464,975
METHOD OF PRODUCING AN ALKALOID FROM NUPHAR LUTEUM
Tamara Nikolaevna Ilinskaya, P.O. Vilar 9, kv. 4, Moskovskaya obl., U.S.S.R.; Alexandr Dmitrievich Kuzovkov, Ul. Grimau 5/1, korp. 2, kv. 31, Moscow, U.S.S.R.; Serafima Alexandrovna Vichkanova, Ramensky raion, pos. Udelnaya, Voenny gorodok 17, kv. 4, Moskovskaya obl., U.S.S.R.; Mira Abramovna Rubinchik, Kutuzovsky prospekt 1, kv. 46, Moscow, U.S.S.R.; Ljudmila Petrovna Tolstykh, P.O. Rastorguevo, sovkhoz Izmailovo 17, kv. 3, Moskovskaya obl., U.S.S.R.; and Yanina Adolfovna Aleshkina, 2 Kvesiskaya ul. 9, kv. 13, Moscow, U.S.S.R.
No Drawing. Filed Aug. 4, 1967, Ser. No. 658,335
Int. Cl. C07g 5/00; A61k 27/00
U.S. Cl. 260—236                                                 2 Claims

ABSTRACT OF THE DISCLOSURE

A preparation containing a protistostatic alkaloid of the formula $C_{30}H_{42}O_4N_2S$ is prepared by extracting the rootstocks of Nuphar luteum with dichloroethane in the presence of $NH_4OH$, treating the extract with 10–15% $H_2SO_4$, alkalinizing the acidic solution to form a precipitate, filtering the precipitate and extracting same with ether, followed by concentrating the ether extract and precipitating inert substances with petroleum ether.

---

The present invention relates to the production of an alkaloid preparation.

The present alkaloid preparation possesses a protistostatic and protistocidal effect and is also intended for the treatment of genitourinary diseases caused by Trichomonas. The preparation likewise possesses a bacteriostatic, fungicidal and spermatocidal effect.

The preparation consists of the hydrochloride of the biologically active alkaloid having the formula $$C_{30}H_{42}O_4N_2S \cdot 2HCl$$

mixed with the hydrochlorides of the biologically inactive alkaloids whose removal would complicate the production process without increasing the effectiveness of the preparation. Besides the presence of the inactive alkaloids increases the solubility of the preparation, thus indirectly promoting its greater effectiveness.

A method is known for producing an alkaloid preparation from the rootstocks of plants of the water lily family (Nymphaceae), particularly the yellow pond lily (Nuphar luteum), for instance, by extracting a mixture of alkaloids with dichloroethane in the presence of ammonium hydroxide with subsequent isolation of the product in the form of the methylene-bis-salicylates or perchlorates thereof.

The known method suffers from the disadvantage that it does not provide a satisfactory yield of the desired product; furthermore, it includes the purification of ether solutions of the alkaloids in columns filled with aluminum oxide, which purification is a lengthy process and involves a major loss of product and solvents.

It is an object of the present invention to provide a method for producing a medicinal alkaloid preparation possessing protistostatic and protistocidal properties.

It is another object of the invention to provide a medicinal alkaloid preparation possessing spermatocidal and fungicidal properties while being only slightly toxic and having no irritating effect on mucous membranes even when used for lengthy periods.

It is yet another object of the invention to provide a method for producing a medicinal alkaloid preparation making it possible to increase the yield of the desired product and simplify the production process.

The present method comprises the extraction of a 0.2–0.4% mixture of alkaloids (calculated on the basis of the dry starting material) from plant raw material having a high alkaloid content, by any known method with subsequent isolation of the desired product from the mixture by means of methods which, in aggregate, characterize the invention and distinguish it from other known methods of producing alkaloids. To produce the preparation by the present method use is made of high-quality raw material having a high alkaloid content, viz. the rootstocks of plants of the water lily family (Nymphacea), particularly the yellow pond lily (Nuphar luteum).

From the alkaloid-containing raw material the alkaloids are extracted with dichloroethane or some other appropriate solvent in the presence of ammonia, and isolated from the dichloroethane with 10–15% sulfuric acid. The acid extracts are made alkaline with 10% ammonium hydroxide, the alkaloids extracted with dichloroethane and again washed out with 10% sulfuric acid. To the acid solution is gradually added 25% ammonium hydroxide with cooling, to pH 7.5–8.0. The precipitate of mixed alkaloids which are insoluble in water is filtered out, washed with water and dried.

The dried mixture of alkaloids which are insoluble in water is extracted with ether and the ether extract dried over potash and evaporated to one-tenth its initial volume. To the residue are added five volumes of petroleum ether to remove inert substances and impurities. The resulting dark flocculent precipitate is filtered out and discarded; the filtrate is dried over potash and saturated with gaseous hydrogen chloride until same is acid to Congo red.

The hydrochloride of the alkaloid thus obtained is filtered out, washed with petroleum ether and dried to constant weight.

The preparation is a pale cream-color powder which is readily soluble in water and alcohol. It is relatively non-toxic, and also has no irritating effect on the mucous membrane even after lengthy use.

The preparation has a protistostatic effect on Trichomonas vaginalis in dilutions of 1:250,000 and 1:1,000,000, and also an immediate protistocidal effect in dilutions of 1:200 and 1:50,000.

The preparation likewise has a bacteriostatic effect on gram-positive microorganisms, and also a fungicidal effect. The biologically active alkaloid in the preparation is optically active:

$[\alpha]_D = +104.2°$ (c=0.96 ethanol); it forms a crystalline perchlorate, M.P. 225–227° (decomp.).

The ensuing example illustrates the method of the invention but is not to be interpreted as limiting the same.

EXAMPLE

Two kg. of dried ground rootstocks of yellow pond lily are mixed with 1 liter of 10% ammonium hydroxide, covered with 14 liters of dichloroethane and left standing for 2 hours, after which the extract is poured off. Extraction is repeated four more times, the last extract being used for the first extraction of a fresh batch of raw material. Each extract is treated twice with 240 ml. of 10% sulfuric acid, the second acid extract being used for the first treatment of the next dichloroethane extract. The acid extracts are combined, made alkaline with 10% ammonium hydroxide solution, the alkaloids again extracted with dichloroethane and again washed out with 10% sulfuric acid. To the acid solution 25% ammonium hydroxide solution is gradually added with cooling to a pH of 7.5–8.0. The precipitate of alkaloids is filtered out, washed with water, dried in the air and extracted with ether. The ether extract is dried over freshly ignited potash, evaporated to one-tenth its initial volume, and five volumes of high-boiling petroleum ether are added with stirring. The precipitate which forms is filtered out, and the filtrate again dried over freshly ignited potash and saturated with gaseous hydrogen chloride to an acid reaction with Congo red.

The precipitate which forms is filtered out, washed with petroleum ether and dried in air to constant weight.

There are obtained 6–6.8 g. of the preparation, or 0.3–0.34% on the basis of the dry raw material.

We claim:

1. A method of producing an alkaloid preparation containing the active alkaloid $C_{20}H_{42}O_4N_2S$ mixed with inactive alkaloids, said method comprising extracting the alkaloid mixture from the rootstocks of *Nuphar luteum* of the family Nymphaceae with dichloroethane in the presence of ammonium hydroxide, treating the extract with 10–15% sulfuric acid, alkalinizing the acidic solution to form a precipitate, filtering off the precipitate and extracting said precipitate with ether, followed by concentrating the ether extract and precipitating inert substances with petroleum ether.

2. A method as claimed in claim 1 wherein alkalinizing is effected with ammonium hydroxide.

References Cited

UNITED STATES PATENTS 3,147,246   9/1964   Aloshkina et al. _____ 260—236

OTHER REFERENCES

Willaman et al.: Economic Botany, vol. 9, No. 2 (April–June, 1955), pages 143, 144.

JAMES A. PATTEN, Primary Examiner

U.S. Cl. X.R.

424—364